(12) United States Patent
Denvir (10) Patent No.: US 9,504,103 B2
(45) Date of Patent: Nov. 22, 2016

(54) DRIVING A MULTI-COLOR LUMINAIRE

(71) Applicant: Kerry J. Denvir, Cambridge, MA (US)

(72) Inventor: Kerry J. Denvir, Cambridge, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 115 days.

(21) Appl. No.: 14/058,923

(22) Filed: Oct. 21, 2013

(65) Prior Publication Data

US 2015/0108908 A1  Apr. 23, 2015

(51) Int. Cl.
*H05B 33/08* (2006.01)

(52) U.S. Cl.
CPC ....... *H05B 33/0815* (2013.01); *H05B 33/0866* (2013.01); *Y02B 20/347* (2013.01)

(58) Field of Classification Search
None
See application file for complete search history.

(56) References Cited

U.S. PATENT DOCUMENTS

| | | | |
|---|---|---|---|
| 5,694,208 A | 12/1997 | Ichikawa | |
| 6,522,108 B2 | 2/2003 | Prager et al. | |
| 7,091,874 B2 * | 8/2006 | Smithson | G08B 5/38 315/291 |
| 8,754,590 B2 * | 6/2014 | Makino et al. | 315/307 |
| 2003/0057888 A1 * | 3/2003 | Archenhold | H05B 33/0818 315/291 |
| 2003/0223255 A1 | 12/2003 | Ben-Yaakov et al. | |
| 2005/0151489 A1 | 7/2005 | Lys et al. | |
| 2006/0192663 A1 | 8/2006 | Bryan et al. | |
| 2006/0211055 A1 | 9/2006 | Hafeman et al. | |
| 2006/0220571 A1 | 10/2006 | Howell et al. | |
| 2007/0210725 A1 * | 9/2007 | Marosek | H05B 33/0815 315/291 |
| 2008/0054815 A1 | 3/2008 | Kotikalapoodi | |
| 2008/0116818 A1 | 5/2008 | Shytenberg et al. | |
| 2008/0238340 A1 * | 10/2008 | Leung | H05B 33/0827 315/297 |
| 2010/0156177 A1 | 6/2010 | Chen et al. | |
| 2010/0295472 A1 | 11/2010 | Wibben et al. | |
| 2010/0315013 A1 | 12/2010 | Li et al. | |
| 2011/0068702 A1 | 3/2011 | Van de Ven et al. | |
| 2012/0032612 A1 * | 2/2012 | Antony | H05B 33/089 315/297 |
| 2012/0153844 A1 * | 6/2012 | Chobot | H05B 33/083 315/185 R |

FOREIGN PATENT DOCUMENTS

| | | | | |
|---|---|---|---|---|
| JP | 06062193 A | * | 3/1994 | ............... H04N 1/04 |
| JP | 2007-027316 A | | 2/2007 | |
| WO | 2012164511 A1 | | 12/2012 | |

OTHER PUBLICATIONS

T Schwarzenberger, International Search Report and Written Opinion of the International Searching Authority for PCT/US2014/060997, Feb. 25, 2015, pp. 1-12, European Patent Office, Rijswijk, The Netherlands.

* cited by examiner

*Primary Examiner* — Dedei K Hammond
(74) *Attorney, Agent, or Firm* — Shaun P. Montana (57) ABSTRACT

Embodiments are disclosed for driving a multi-color solid state light source luminaire so as to maintain a color point as temperature varies within a given range. An array of solid state light sources includes two or more strings and is driven by a single constant current source. The array is topologically arranged to allow for control of the division of current between the strings of solid state light sources. In one such current-sharing scenario, the duty cycle of a switching control signal corresponds directly to the proportion of current that flows in one of two distinct strings of solid state light sources. Thermal feedback is used to control the duty cycle. In this way, the amount of current that flows in both strings may be adjusted as temperature changes.

15 Claims, 6 Drawing Sheets

FIG. 4

DRIVING A MULTI-COLOR LUMINAIRE

CROSS-REFERENCE TO RELATED APPLICATIONS

The present application is related to Patent Cooperation Treaty Application No. PCT/IB2012/052731, titled "A Method of Driving LED Lighting Sources and Related Device" filed May 31, 2012, which claims priority to Italian Patent Application No. TO2011A000486 filed Jun. 3, 2011, the entire contents of both of which are hereby incorporated by reference.

TECHNICAL FIELD

The present invention relates to lighting, and more specifically, to driving solid state light sources.

BACKGROUND

As solid state light sources have become more common in lighting applications and products, it is typically desirable to be able to drive separate groupings of the solid state light sources. One of the most common groupings of solid state light sources is a string of solid state light sources. Some common approaches to drive separate strings include, but are not limited to, using current limiting resistors in series with each string and having a common voltage source; current mirrors in each string; series linear regulation via sense resistors and pass transistors in each string; buck regulators for each string; arranging all strings in series with a current source and including a shunting switch across each subsection of the string; and a multi-channel constant current source.

SUMMARY

However, there are a number of non-trivial issues associated with driving separate strings of solid state light sources. There issues are particularly relevant when the strings generate different colors of light and respond differently to changes in temperature. For instance, consider the case where there is a combination of a first string of solid state light sources generating a first color of light, for example a whitish-green or mint color (referred to as mint solid state light sources), and a second string of solid state light sources generating a second color of light, for example an amber color (referred to as amber solid state light sources). When combined, the light output by the first and second strings is white light, with a higher CRI and efficacy than solid state light sources that themselves generate white light. In general, the efficacy of solid state light sources decreases with increasing temperature. In particular, and continuing with the given example case, the amber solid state light sources exhibit a greater loss of efficacy with increasing temperature than do the mint solid state light sources. Unless this disparity with respect to change in efficacy in response to changing temperature is mitigated, the color point of an array formed of two or more strings of solid state light sources, where at least one string generates light of one color and at least one other string generates light of another color, will also shift with temperature. Excessive color point shift may be noticeable to the human eye and is therefore undesirable.

Embodiments overcome these deficiencies by providing a lighting system that is configured to compensate for disparate changes in efficacy in response to changing temperature.

In some embodiments, the current in a first color string of an array (e.g., a string of amber solid state light sources) is increased as temperature increases so as to mitigate the loss disparity with respect to a second color string in the array (e.g., a string of mint solid state light sources). This is accomplished, for example, by increasing the duty cycle of a switch through which the string current flows, wherein thermal feedback is used as a parameter that adjusts the duty cycle of that switch. This provides temperature-based control of the current flow through the array of strings, and consequently the current through each string of the array. Thus, and continuing to refer to the example case described above, when temperature increases, the duty cycle of the switch controlling current flow through the strings is increased accordingly (assuming the switch is connected to the string of amber solid state light sources). This allows the a device and/or system including the array to compensate for the difference in efficacy versus temperature between the string of mint solid state light sources and the string of amber solid state light sources. In embodiments where the switch, which may be but is not limited to a FET, is connected to the string of mint solid state light sources, when temperature increases, the duty cycle of the FET switch is decreased accordingly, so as to compensate for the difference in efficacy versus temperature in the strings. Note that the placement of the FET switch, or other suitable switching mechanism, varies from one embodiment to the next, so long as disparate impacts to string efficacy with respect to changing temperature are mitigated. Numerous such variations and color schemes will be apparent in light of this disclosure.

In some embodiments, a lighting system includes driver circuitry that is configured, for example, with a temperature sensor such as, but not limited to, a thermistor. As is known, a thermistor is a semiconductor device that exhibits a significant change in its resistance given a change in its temperature, and has either a positive temperature coefficient of resistance (PTC) or a negative temperature coefficient of resistance (NTC). For an NTC, the resistance of the thermistor decreases as the temperature increases. Thermistors generally work over a given temperature range (e.g., 0° Celsius to 100° Celsius), and may be configured to operate with higher accuracy in a narrower range to minimize the non-linear response of the thermistor. In some embodiments, the temperature sensor circuitry is implemented with an NTC thermistor resistive divider circuit. However, any other suitable temperature sensor device or circuitry may be, and in some embodiments is, used to generate an actionable temperature sense signal in response to changing temperature. Thus, embodiments are not intended to be limited to any particular type of temperature sensing technology or circuit topology.

In some embodiments, the driver circuitry further includes a duty cycle generator configured to translate the temperature sense signal to a change in duty cycle of the gate drive to a FET switch connected to the array of strings. This duty cycle generator may be, and in some embodiments is, implemented in a variety of ways. For instance, in some embodiments, the duty cycle generator includes a ramp wave generator and a comparator for comparing the ramp wave output to a reference voltage derived from the temperature sensor circuitry. In operation, the duty cycle of the comparator output varies with the temperature sense signal, and this output is used to drive the gate of the FET switch (or other current switching circuit). This duty cycle generator circuitry is implemented, for example but not limited to, with discrete components populated on a printed circuit board and/or integrated circuitry configured to provide a pulse width modulator that modulates the gate drive signal. In some embodiments, the string switching duty cycle is modulated via a microcontroller or purpose-built semiconductor configured to sense changes in temperature. Numerous suitable duty cycle generator configurations will be apparent in light of this disclosure.

Thus, an embodiment of the present invention provides a lighting circuit that uses thermal feedback in conjunction with a current-sharing technique to achieve stability of the color point (color balancing) of a lighting device and/or system across a specified temperature range. The output color is therefore maintained, for instance, within a defined number of MacAdam steps over the given temperature range. The techniques are implemented via analog and/or digital circuitry, depending on the preferred domain, and are particularly useful for lighting devices and/or systems including a two-string array of solid state light sources that uses color mixing to produce white light, where the array is controlled by a single current source. Numerous variations and configurations will be apparent in light of this disclosure. In a more general sense, the array may, and in some embodiments does, include any number N of strings of solid state light sources, using N−1 current switches.

In an embodiment, there is provided a lighting system. The lighting system includes: a temperature sensor circuit configured to generate a temperature sense signal; a duty cycle generator circuit configured to receive the temperature sense signal and generate a pulse width modulated (PWM) signal having a duty cycle that changes in response to changes in temperature as indicated by the temperature sense signal; and an array of solid state light sources comprising a plurality of strings of solid state light sources, wherein at least one string of solid state light sources in the plurality of strings of solid state light sources is operatively coupled to a switch controlled by the PWM signal, wherein the switch controls current flow through the plurality of strings of solid state light sources.

In a related embodiment, the duty cycle of the PWM signal may be increased or decreased in response to a corresponding increase or decrease in temperature detected by the temperature sensor circuit. In another related embodiment, the duty cycle generator may include: a ramp generator configured to generate a periodic ramp signal; and a comparator configured to receive the temperature sense signal and the ramp signal as input and to generate the PWM signal therefrom. In a further related embodiment, the ramp generator may include a current source connected to a capacitor and timer circuitry configured to generate an oscillating ramp signal. In another further related embodiment, the duty cycle generator may include a driver circuit configured to receive the PWM signal from the comparator and to drive the PWM signal to the switch.

In yet another related embodiment, the duty cycle generator may include: a duty-cycle-to-voltage conversion stage to convert the PWM signal to a DC voltage; an error amp configured to provide negative feedback to regulate the DC voltage; a ramp generator configured to generate a periodic ramp signal; and a comparator configured to receive both the output of the error amp and the ramp signal as inputs and to generate the PWM signal therefrom. In a further related embodiment, the duty-cycle-to-voltage conversion stage may include: a low pass filter to convert the PWM signal to the DC voltage; and a driver circuit configured to receive the PWM signal and to provide it to the low pass filter. In a further related embodiment, the duty cycle generator may further include a buffer to isolate the error amp from the low pass filter. In a further related embodiment, the buffer may be configured to provide gain to the DC voltage that is output by the low pass filter. In another further related embodiment, at least one of the buffer and the driver circuit may be powered by a temperature-compensated voltage supply. In a further related embodiment, the ramp generator, the error amp, the comparator, and the temperature-compensated voltage supply may be on-chip functional blocs of an integrated circuit.

In still another related embodiment, the temperature sensor circuit may include a thermistor-based resistive divider. In yet still another related embodiment, the lighting system may further be configured to increase total input current provided to the array of solid state light sources to compensate for a decrease in lumens output by the array of solid state light sources resulting from string-current rebalancing.

In another embodiment, there is provided a method of controlling a lighting system. The method includes: receiving a temperature sense signal; generating a pulse width modulated (PWM) signal having a duty cycle that changes in response to changes in temperature as indicated by the temperature sense signal; and controlling a string current flow of an array of solid state light sources using the PWM signal, wherein the array of solid state light sources comprises a plurality of strings of solid state light sources.

In a related embodiment, generating the PWM signal may include: generating a ramp signal; and comparing the temperature sense signal and the ramp signal to generate the PWM signal therefrom. In another related embodiment, generating the PWM signal may include: converting the duty cycle of the PWM signal to a DC voltage; comparing the DC voltage to a reference via an error amplifier and a feedback network; generating a ramp signal; and comparing the output of the error amplifier and the ramp signal to generate the PWM signal therefrom. In a further related embodiment, converting the duty cycle of the PWM signal to a DC voltage may be carried out with a low pass filter, and the method may further include buffering the low pass filter from the error amplifier and the feedback network.

In another embodiment, there is provided a lighting system. The lighting system includes: a temperature sensor circuit configured to generate a temperature sense signal and comprising a thermistor-based resistive divider; a duty cycle generator circuit configured to receive the temperature sense signal and to generate a pulse width modulated (PWM) signal having a duty cycle that changes in response to changes in temperature as indicated by the temperature sense signal, the duty cycle generator circuit comprising: a ramp generator configured to generate a ramp signal; and a comparator configured to receive a signal indicative of the temperature sense signal and the ramp signal as input and to generate the PWM signal therefrom; and an array of solid state light sources comprising a plurality of strings of solid state light sources and topologically arranged to allow for control of the division of current between the strings, wherein at least one string in the plurality of strings is operatively coupled to a switch controlled by the PWM signal, wherein the switch controls current flow through the plurality of strings.

In a related embodiment, the array of solid state light sources may include a first string and a second string, wherein the first string may have solid state light sources generating light of a first color and wherein the second string may have solid state light sources generating light of a second color that is different from the first color.

In another related embodiment, the lighting system may further include a power supply having a control circuit configured to increase total input current provided to the array in response to changes in at least one of temperature and/or the duty cycle.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

As used throughout, the term solid state light source(s) refers to one or more light emitting diodes (LEDs), organic light emitting diodes (OLEDs), polymer light emitting diodes (PLEDs), organic light emitting compounds (OLECs), and/or any other solid state light emitter, whether singular or plural, regardless of interconnection, and including all combinations thereof. Embodiments are described as including at least two strings of solid state light sources, where one string includes solid state light sources generating a first color of light and where the other string includes solid state light sources generating a second color of light, such that the first color of light is distinct from the second color of light. For ease of explanation only, references are made throughout to one string including one or more amber solid state light sources and to the other string including one or more mint solid state light sources, respectively. As used herein, the term amber solid state light source(s) includes a solid state light source that emits light that is substantially within and/or substantially within the red and/or orange color spaces of the 1931 CIE chromaticity diagram. In some embodiments, an amber solid state light source(s) has a wavelength of substantially 605 nm to substantially 650 nm, and in some embodiments has a wavelength of substantially 620 nm. As used herein, the term mint solid state light source(s) includes a solid state light source that generates white light that has a more greenish element to the white light, such that it is above the Planckian curve and is in and/or substantially in the green color space of the 1931 CIE chromaticity diagram. The number of solid state light sources in a string will depend on, for example but not limited to, the application for which the light is intended as well as the desired output characteristics, such as but not limited to lumens, dimming, and the like. Embodiments include at least two strings of state light sources, where a first of the strings emits light having a color point that is distinct and/or substantially distinct from a second of the strings.

Techniques are disclosed for driving an array of solid state light sources of at least two different colors (also referred to herein as a string array) so as to maintain a color point of the mixed light generated thereby as temperature varies within a given range. In some embodiments, the array includes two or more strings, with at least one string of a first color and at least one string of a second color, and is driven by a single constant current source. The array is topologically arranged to allow for control of the division of current between the strings. In some embodiments, the duty cycle of a switching control signal corresponds directly to the proportion of current that flows in one of two distinct strings of solid state light sources. In some embodiments, thermal feedback is used to control the duty cycle of the switching control signal. In this way, the amount of current that flows in both strings may be adjusted as temperature changes. This is particularly useful with strings that generate light of different colors. Though embodiments are described in the context of a two-string array, embodiments may include arrays of N strings using N−1 active switches, as will be appreciated in light of this disclosure.

Figure 1:
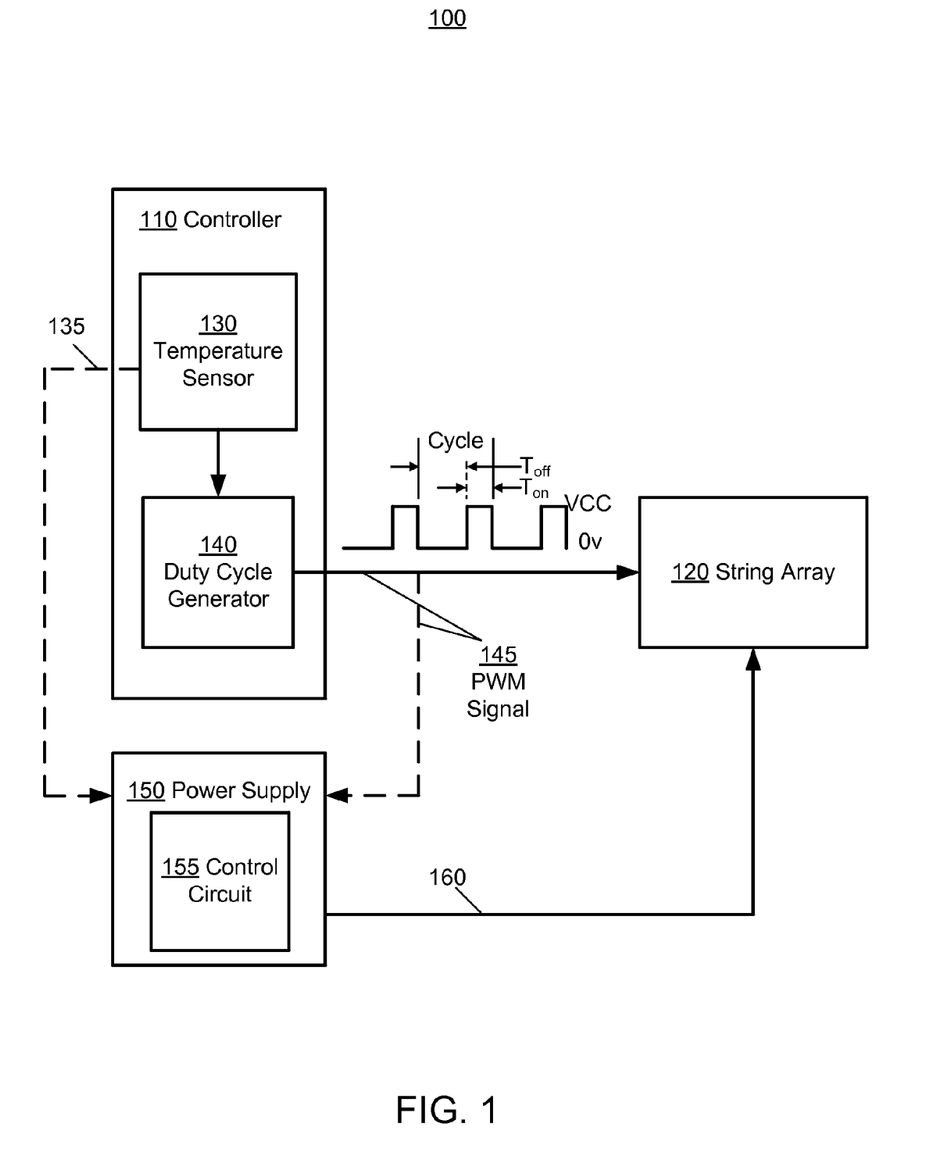
FIG. 1 illustrates a block diagram of a lighting system according to embodiments disclosed herein.

FIG. 1 illustrates a block diagram of a lighting system 100 that includes a controller 110 driving a string array 120, which is formed of at least two strings of solid state light sources, as described above. A power supply 150 provides power 160 to the string array 120. The controller 110 includes a temperature sensor 130 providing thermal feedback to a duty cycle generator 140. The duty cycle generator 140 generates an output pulse waveform 145, shown in FIG. 1 and also referred to throughout as a PWM Signal 145. In operation, based upon the thermal feedback from the temperature sensor 130, the duty cycle generator 140 varies the output pulse waveform by increasing the duty cycle as the temperature increases, and decreasing the duty cycle as the temperature decreases. The duty cycle of the output pulse waveform effectively controls the current flowing through the strings of solid state light sources of the string array 120. By increasing the current to select string(s) of the string array 120 as the temperature increases, that string(s) is(are) able to maintain the same (or otherwise comparable within a given tolerance and/or substantially the same) CRI and color point over a desired temperature range (for example but not limited to 20 to 70° C.). As is known, a color rendering index (CRI) generally defines the ability of a given light source to match colors with an ideal or natural light source, and luminous efficacy generally refers to the ability of a light source to effectively produce visible light.

The output pulse waveform 145 (that is, the PWM Signal 145) generated by the duty cycle generator 140 of the controller 110 is associated with a given cycle or frequency, such as but not limited to 200 KHz or any other suitable switching cycle that is fast enough to avoid flicker of the solid state light sources and to allow for use of capacitors of desirable size. The duty cycle of the output pulse waveform 145 is increased or decreased as desired and in accordance with the principles described herein. Given a fixed frequency, an increase in the duty cycle may refer, for example, to an increase in on-time of the given cycle (and corresponding decrease in off-time of the given cycle). The change in the duty cycle effectively causes a change in the current flowing in a string of solid state light sources of the string array 120, thereby compensating for changes in efficacy of that string. This change in current may be thought of as a temperature-based string-current rebalancing.

Note that, in some embodiments, the lumens output by the string array 120 may decrease as a result of the temperature-based string-current rebalancing as described herein. In such cases, increasing the total input current with temperature increase may be, and in some embodiments is, used to compensate for this decrease in lumens. This increase in total input current may be, and in some embodiments is, triggered, for example, by a microcontroller or other control circuit in response to changes in the duty cycle of the PWM Signal 145. For instance, in FIG. 1, the PWM Signal 145 is optionally be provided to the power supply 150 (shown in dashed line) and received by a control circuit 155 provisioned therein. The control circuit 155 is programmed or otherwise configured to set the total input current provided to the string array 120 based on the detected duty cycle of the PWM Signal 145. In some embodiments, the control circuit 155 is implemented with a microcontroller that includes or otherwise has access to a memory system (not shown) that includes a look-up table that correlates the ratio of time on ($T_{on}$)/time off ($T_{off}$) of the detected duty cycle to a current. So, once a given $T_{on}/T_{off}$ ratio is known, the table is queried to identify the appropriate total input current for that $T_{on}/T_{off}$ ratio. The appropriate total input current values are computed, for example but not limited to, based on empirical data and/or theoretical analysis. Numerous other such configurations where the total input current is varied to compensate for undesired changes in lumen output will be apparent in light of this disclosure. For instance, in some embodiments, the control circuit 155 is programmed or otherwise configured to set the total input current provided to the string array 120 optionally based on a detected temperature 135, which is received from the temperature sensor 130 (also shown in dashed line). In such embodiments, the control circuit 155 is implemented with a microcontroller that includes or otherwise has access to a memory system including, for example but not limited to, a look-up table that correlates the temperature data (indicative of light engine temperature) to a current. So, once a given temperature is known via the detected temperature 135 from the temperature sensor 130, the table is queried to identify the appropriate total input current for that temperature. The appropriate total input current values are computed, for example, based on empirical data and/or theoretical analysis.

Figure 2A:
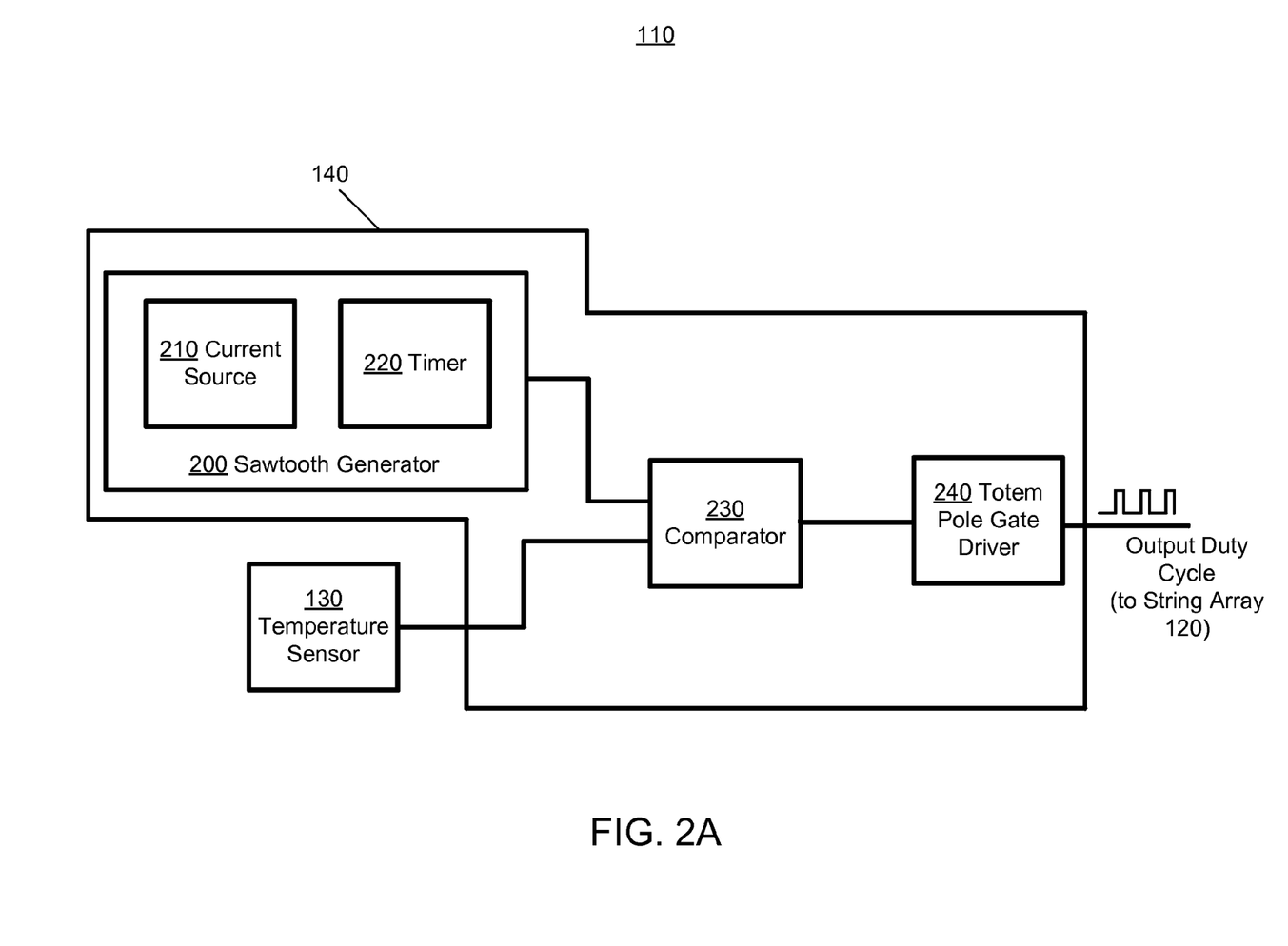
FIG. 2A illustrates a block diagram of a controller of the lighting system of FIG. 1 according to embodiments disclosed herein.

FIG. 2A illustrates a block diagram of the controller 110 of the lighting system 100 shown in FIG. 1. As shown in FIG. 1, the controller 110 includes a temperature sensor 130 operatively coupled to a duty cycle generator 140. The duty cycle generator 140 of FIG. 2A includes a sawtooth generator 200 comprising a current source 210 and a timer 220. The duty cycle generator 140 of FIG. 2A also includes a comparator 230 and a totem pole gate driver 240. In operation, the sawtooth generator 200 generates a periodic ramp wave signal and provides this to the comparator 230. The comparator 230 receives the periodic ramp wave from the sawtooth generator 200 and a sense signal as a variable DC reference voltage from the temperature sensor 130. The comparator 230 then outputs a signal having a frequency equal to the frequency of the periodic ramp wave signal and a duty cycle based on the variable DC reference voltage from the temperature sensor 130. To this end, the comparator 230 effectively generates a fixed frequency pulse width modulated output having a duty cycle that varies with temperature. This output duty cycle of the comparator 230 is then buffered by the totem pole gate driver 240. The output duty cycle is provided to the switch array 120.

Figure 2B:
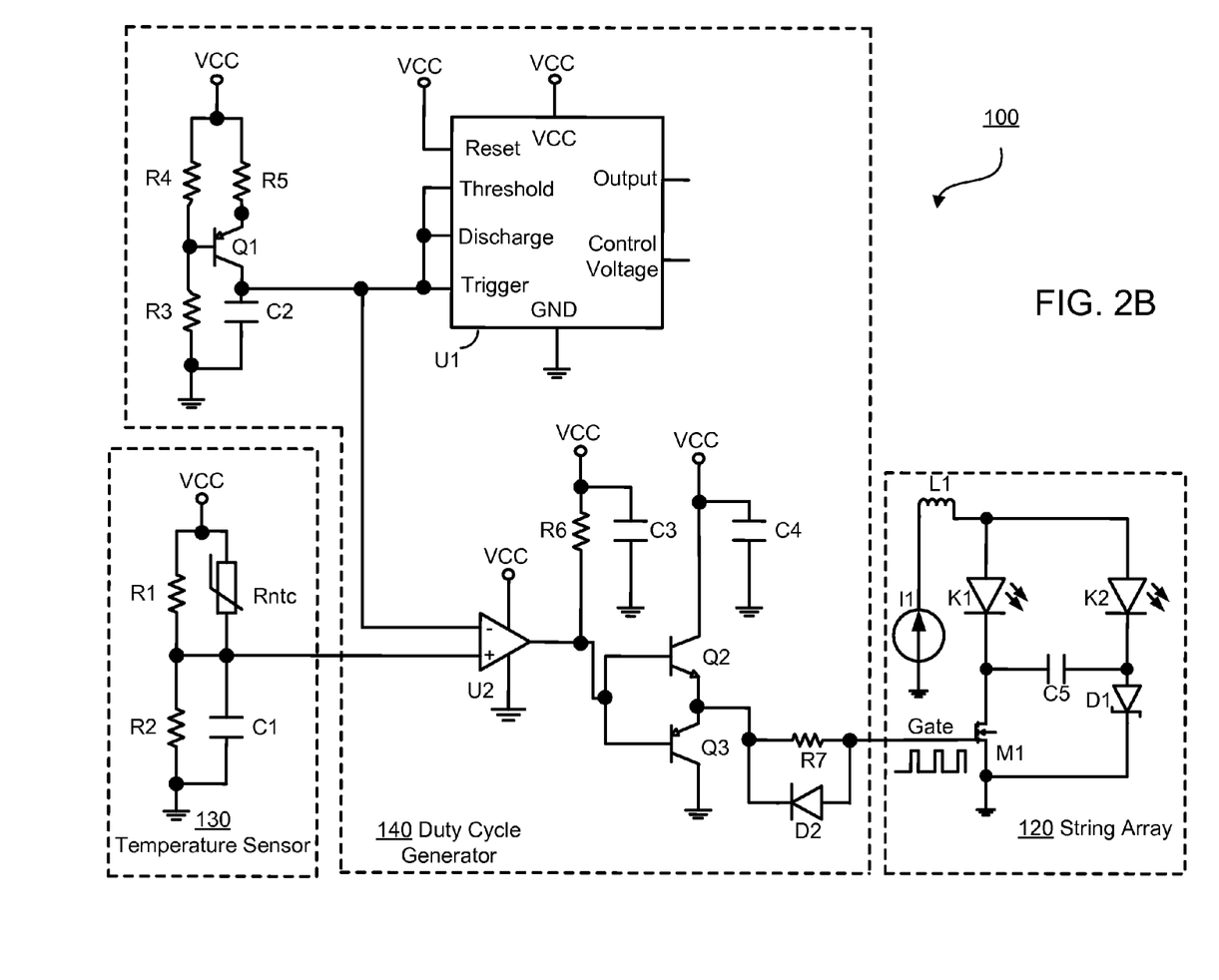
FIG. 2B illustrates a schematic diagram of a lighting system including the controller of FIG. 2A according to embodiments disclosed herein.

FIG. 2B illustrates a schematic diagram of a portion of the lighting system 100 of FIG. 1. In FIG. 2B, the portion of the lighting system 100 shown includes the controller 110, the string array 120, the temperature sensor 130, and the duty cycle generator 140. In FIG. 2B, the temperature sensor 130 includes an NTC thermistor Rntc configured in a resistive divider including resistors R1 and R2, which receives power via an input VCC. The resistor R1 is connected to the input VCC and the resistor R2, while the resistor R2 is also connected to ground. The NTC thermistor Rntc is connected in parallel across the resistor R1. A capacitor C1 is optionally connected in parallel across the resistor R2 and is used to filter out noise. The temperature sensor 130 outputs a reference voltage from the connection between the resistors R1 and R2 at a given temperature that is equal to: VCC (R2)/[(R1//Rntc)+R2]. In some embodiments, the following circuit parameters and components are provided: VCC=5V; R1=15 kΩ; R2=4.7 kΩ; Rntc~100 kΩ (at 20° C.); and C1=10 nF. Numerous other configurations will be apparent in light of this disclosure, and embodiments are not intended to be limited to any particular one or to be limited to the specific example components or values provided herein.

The duty cycle generator 140 of FIG. 2B includes the sawtooth generator 200 of FIG. 2A implemented with a PNP current source driving a capacitor connected to a timer integrated circuit U1. In FIG. 2B, the PNP current source includes a transistor Q1 having a base, a collector, and an emitter, and resistors R3, R4, and R5, along with capacitor C2, and also receives power via an input VCC. The resistor R4 is connected between the input VCC and the resistor R3, and is also connected to the base of the transistor Q1. The resistor R3 is connected to the base of the transistor Q1 and is also connected to ground. The resistor R5 is connected between the input VCC and the emitter of the transistor Q1. The capacitor C2 is connected between the collector of the transistor Q1 and ground. The PNP current source charges the capacitor C2 such that the voltage drop across the capacitor C2 increases linearly. The timer integrated circuit U1 receives the voltage drop across the capacitor C2 and measures this voltage drop, and will discharge the capacitor C2 once a particular threshold voltage is measured. After the capacitor C2 discharges, the PNP current source will again charge the capacitor C2, and the process repeats, generating a sawtooth waveform. The frequency of the ramp provided at the collector of the transistor Q1 is set by the output of the PNP current source, the capacitance of the capacitor C2, and the threshold voltage of the timer integrated circuit U1. In some embodiments, the following components are provided: R3=200 kΩ; R4=54.9 kΩ; R5=1.6 kΩ; C2=300 pF; U1=a 555 timer IC; and Q1=a BC857C BJT.

The duty cycle generator 140 includes a comparator U2, corresponding to the comparator 230 of FIG. 2A, which includes a non-inverting input, an inverting input, a positive power supply, a negative power supply, and an output. The positive power supply is connected to the VCC input and the negative power supply is connected to ground. The ramp taken at the capacitor C2 and the collector of the transistor Q1 is provided to the inverting input of the comparator U2, while the variable DC reference voltage from the temperature sensor 130 is provided to the non-inverting input of the comparator U2. As such, the output of the comparator U2 is a signal of a frequency set by the sawtooth generator and a duty cycle based upon the variable DC reference voltage provided by the temperature sensor 130. A resistor R6 is connected between the output of the comparator U2 and the input VCC, and provides a pull-up function. A capacitor C3 connected between the input VCC and ground is optionally used to filter AC noise. In some embodiments, the following components are provided: R6=1 kΩ; C3=100 nF; and U2=an LM311 op-amp.

The totem pole gate driver 240 shown in FIG. 2A is implemented in FIG. 2B with an NPN transistor Q2 and a PNP transistor Q3, each having a base, a collector, and an emitter, and is arranged in a typical gate driver fashion, along with a filter capacitor C4, a resistor R7, and a diode D2. Thus, the output of the comparator U2 is connected to the base of the NPN transistor Q2 and to the base of the PNP transistor Q3. The collector of the NPN transistor Q2 is connected to the input VCC. The emitter of the NPN transistor Q2 is connected to the emitter of the PNP transistor Q3. The collector of the PNP transistor Q3 is connected to ground. The filter capacitor C4 is connected between the collector of the NPN transistor Q2 and the input VCC. The resistor R7 is connected to the emitter of the NPN transistor Q2 (and thus the emitter of the PNP transistor Q3), and on its other side is the output of the duty cycle generator 140. The diode D2 is connected in parallel across the resistor R7, and includes an anode and a cathode, with the cathode connected to the emitter of the NPN transistor Q2 (and thus the emitter of the PNP transistor Q3). In some embodiments, the following components are provided: Q2=a BC847C NPN BJT transistor; Q3=a BC857C PNP BJT transistor; R7=10Ω; C4=100 nF; and D2=a 1N4148 diode.

With the various specific example components/values provided as described above, the ramp of the duty cycle generator 140 of FIG. 2B will have a period of about 4.00 µs. Thus, for an Rntc of 100 kΩ, a time on $T_{on}$ of the duty cycle equals about 1.25 µs, and for an Rntc of 25KΩ, a time on $T_{on}$ of the duty cycle equals 1.70 µs. As will be appreciated, the component/values may be, and in some embodiments are, changed so as to accommodate a desired temperature range and corresponding change in duty cycle.

FIG. 2B further illustrates a dual string array 120. As can be seen, a current source I1 provides current through a series-inserted inductor L1 to a first string of solid state light sources K1 and to a second string of solid state light sources K2. It should be noted that while only a single inductor L1 is shown, numerous other topologies will be apparent in light of this disclosure, including where the inductor L1 is part of the current source 1I. For example, in some embodiments, the inductor is serially connected to the string(s) in a different location, or two inductors are used with one inductor connected in series with each string. As will be further appreciated, while the first string of solid state light sources K1 and the second string of solid state light sources K2 are each shown as including only a single solid state light source (namely, an LED), this is for convenience of space only, and the first string of solid state light sources K1 and the second string of solid state light sources K2 may and in some embodiments do contain numerous solid state light sources connected in series in each string, with an appropriate current source I1 depending on the number and forward voltages of the solid state light sources. In some embodiments, the first string of solid state light sources K1 and the second string of solid state light sources K2 may each have a different number of solid state light sources, while in other embodiments, each string has the same number of solid state light sources. Note, however, that the total forward voltage of the first string of solid state light sources K1 is less than that of the second string of solid state light sources K2, as will be appreciated in light of this disclosure. In some embodiments, the strings K1 and K2 contain the same type of solid state light sources, while in other embodiments, the strings K1 and K2 contain different types of solid state light sources. Thus, for example, in some embodiments, the first string of solid state light sources K1 includes eight amber solid state light sources connected in series and the second string of solid state light sources K2 includes thirteen mint solid state light sources connected in series. The strings K1 and K2 are connected to one another by a bridging capacitor C5. Though FIG. 2B shows only a single bridging capacitor C5, in some embodiments, more than one capacitor is used to form the bridge, such as capacitors in parallel and/or in series between the strings K1 and K2. Additional details of the string array 120 are found in the previously incorporated PCT Application No. PCT/IB2012/052731.

The string array 120 also includes an N-channel MOSFET M1 (also referred to herein as a FET switch M1), including a gate, a source, and a drain. The drain of the MOSFET M1 is connected to the first string of solid state light sources K1. The source of the MOSFET M1 is connected to ground, which is the return path for the current source I1. In addition, the FET switch M1 has its gate driven by the output of the duty cycle generator 140. In general, the FET switch M1 operates in a switch-like mode, either on or off. A Schottky diode D1 is connected between the second string of solid state light sources K2 and the return path for the current source I1, to block any reverse current. Thus, the bridging capacitor C5 is connected between an anode of the Schottky diode D1 and the drain of the MOSFET M1. During the "on" time ($T_{on}$), the FET switch M1 is in an "on" state and allows current to flow from the current source I1, through the inductor L1, through the first string of solid state light sources K1, and through the FET switch M1, to the return path of the current source I1. During the "off" time ($T_{off}$), the FET switch M1 is "off" and acts as an open-circuit for the current path. As a result, current flows from the current source I1, through the inductor L1, through the second string of solid state light sources K2, through the Schottky diode D1, and to the return of the current source I1.

Prior to the circuit being energized, no current is flowing in either of the two strings K1 and K2, and the bridging capacitor C5 is fully discharged. Assume that the total forward voltage ($V_f$) of the first string K1 is less than that of the second string K2 for a given current. As soon as the power is enabled and while the MOSFET M1 is off, current flows from the current source I1, through the inductor L1, through the first string K1, the bridging capacitor C5, and the Schottky diode D1 until the bridging capacitor C5 charges up to its peak voltage, which is the difference between the total forward voltage of the second string K2 and the first string K1. At this point, the bridging capacitor C5 appears as an open circuit (or otherwise sufficiently high impedance) and no current flows through it. If the FET switch M1 remained off, the current would flow through the second string K2 and the Schottky diode D1. During the on portion of the duty cycle ($T_{on}$), the FET switch M1 is on and allows the current to flow directly through the FET switch M1 and the first string K1. At the same time, the bridging capacitor C5 discharges and supplies current to the second string K2. When the FET switch M1 turns off, the bridging capacitor C5 charges again toward the difference voltage between the two strings K1 and K2, and current flows through the second string K2 and through the Schottky diode D1. As the duty cycle of the gate drive of the FET switch M1 varies, the percentage of total current flowing in the strings K1 and K2 varies. The larger the duty cycle, the higher the percentage of current flowing in the first string K1. As will be appreciated, this technique inhibits current hogging (positive feedback) in parallel strings of solid state light sources, such as but not limited to the first string K1 and the second string K2. With the addition of just a few components, the current in both strings is controlled with the duty cycle of the gate signal driving the FET switch M1.

Figure 3A:
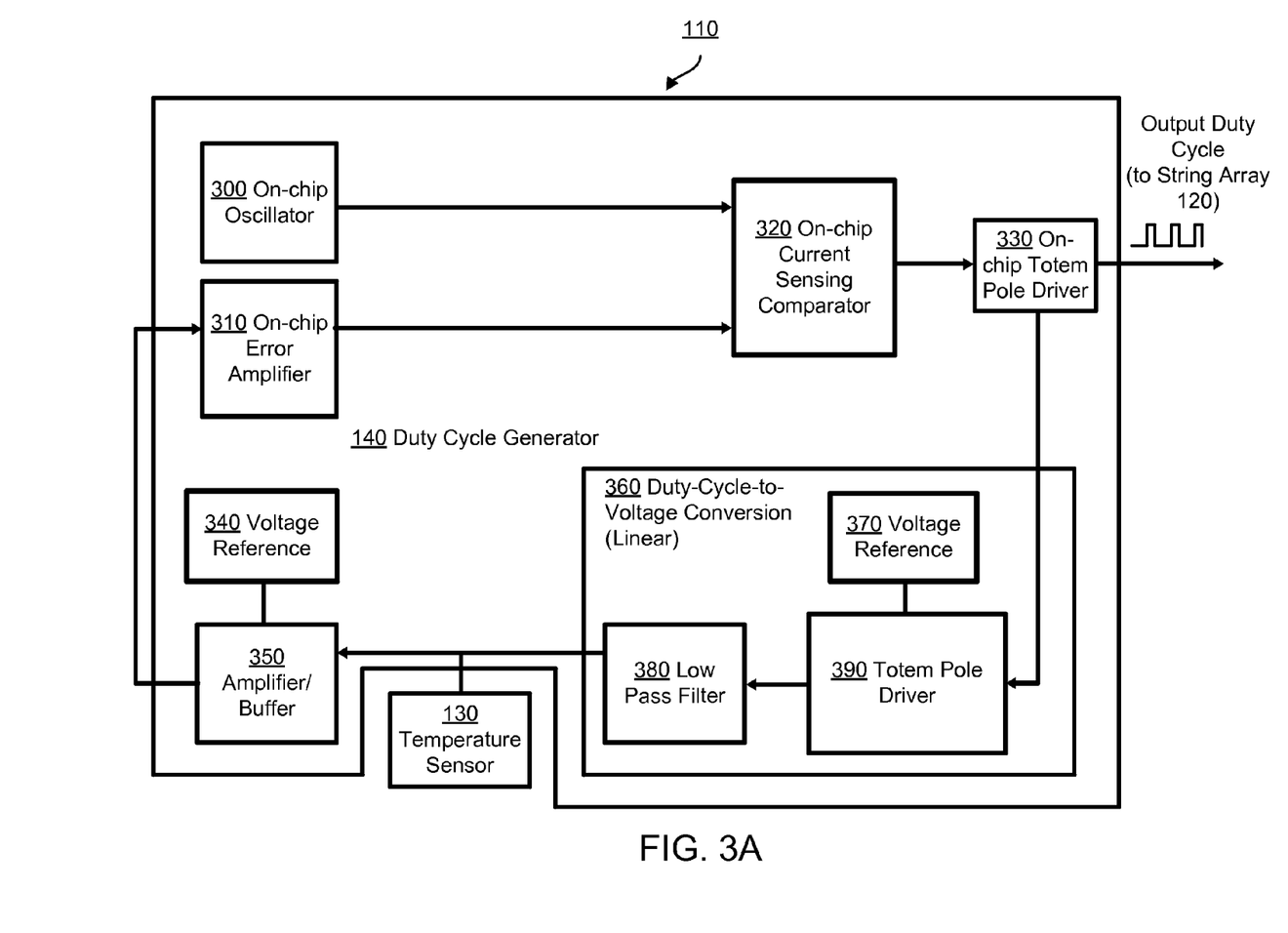
FIG. 3A illustrates a block diagram of the controller of the lighting system shown in FIG. 1 according to embodiments disclosed herein.

FIG. 3A is a block diagram of the controller 110 of the lighting system 100 shown in FIG. 1, where various components are located on an integrated circuit (IC) chip. The controller 110 of FIG. 3A includes the duty cycle generator 140 and the temperature sensor 130. The duty cycle generator 140 includes an amplifier/buffer 350, a duty-cycle-to-voltage conversion 360, and a number of on-chip blocks including an on-chip oscillator 300, an on-chip error amplifier 310, an on-chip current sensing comparator 320, and an on-chip totem pole driver 330. Each of the on-chip blocks is, in some embodiments, part of an integrated circuit (IC) chip, such as but not limited to a current mode controller IC such as the UC2843. In addition to the on-chip oscillator 300, the on-chip error amplifier 310, the on-chip current sensing comparator 320, and high current output blocks, the UC2843 further provides a temperature-compensated voltage reference 370, which is used to power the amplifier/buffer 350 and a totem pole driver 390 that is part of the duty-cycle-to-voltage conversion stage 360.

In FIG. 3A, the duty-cycle-to-voltage conversion stage 360 is carried out using a low pass filter 380, which in some embodiments is an RC filter, and which is implemented, in some embodiments, with a second-order arrangement, though of course other suitable conversion techniques may be, and in some embodiments are, used as well. The output of the duty-cycle-to-voltage conversion stage 360 (see FIG. 3B) should not be corrupted by peak-to-peak voltage variations of the output of the on-chip totem pole driver 330, so the totem pole driver 390 together with a stiff or otherwise well-regulated voltage reference is used to isolate these circuit functions. Note that the totem pole driver 390 included in the duty-cycle-to-voltage conversion stage 360 is separate and distinct from the on-chip totem pole driver 330. The voltage reference 370 provides power to the totem pole driver 390, and together these stages are used to provide a more stable duty-cycle-to-voltage conversion within the duty-cycle-to-voltage conversion stage 360. The voltage reference 370, is temperature-compensated, and tuned reasonably precisely. Further, the voltage reference 370 may be and in some embodiments is 5V. Note that, in some embodiments, the voltage reference 340 and the voltage reference 370 are the same voltage source, however in other embodiments, the voltage reference 340 and the voltage reference 370 are distinct. This allows a loosely regulated input voltage Vcc to be provided for powering the IC (e.g., ~12V, but with ripple or variations) without concern for variations in the input voltage Vcc disturbing the duty-cycle-to-voltage conversion stage 360. The on-chip totem pole driver 330 would be susceptible to such variations.

In operation, the on-chip oscillator 300 creates a sawtooth waveform that is applied to an input of the on-chip current sense comparator 320. The on-chip error amplifier 310 allows negative feedback to be used from the amplifier/buffer 350. The output of the on-chip error amplifier 310 serves as the other input to the on-chip current sense comparator 320. Thus, once duty cycle is converted to a voltage, the on-chip error amplifier 310 provides negative feedback to regulate that voltage. Note that the characteristics of the feedback source vary with the feedback network impedance. As such, and depending on the voltage level, directly connecting the output of the low pass filter 380 to the on-chip error amplifier 310 may be problematic. Therefore, the amplifier/buffer 350 is inserted between the output of the low pass filter 380 and the feedback path, as further shown in FIG. 3A. In some embodiments, the on-chip error amplifier 310 is configured with a fixed gain and a fixed reference, and the amplifier/buffer 350 that drives the on-chip error amplifier 310 also has a fixed gain and is powered by the temperature-compensated voltage reference 340. In some embodiments, the voltage reference 340 is a temperature-compensated 5V DC supply that is generated on-chip and used to power circuits external to the IC, such as but not limited to the discrete totem pole driver 390 of the duty-cycle-to-voltage conversion stage 360.

Figure 3B:
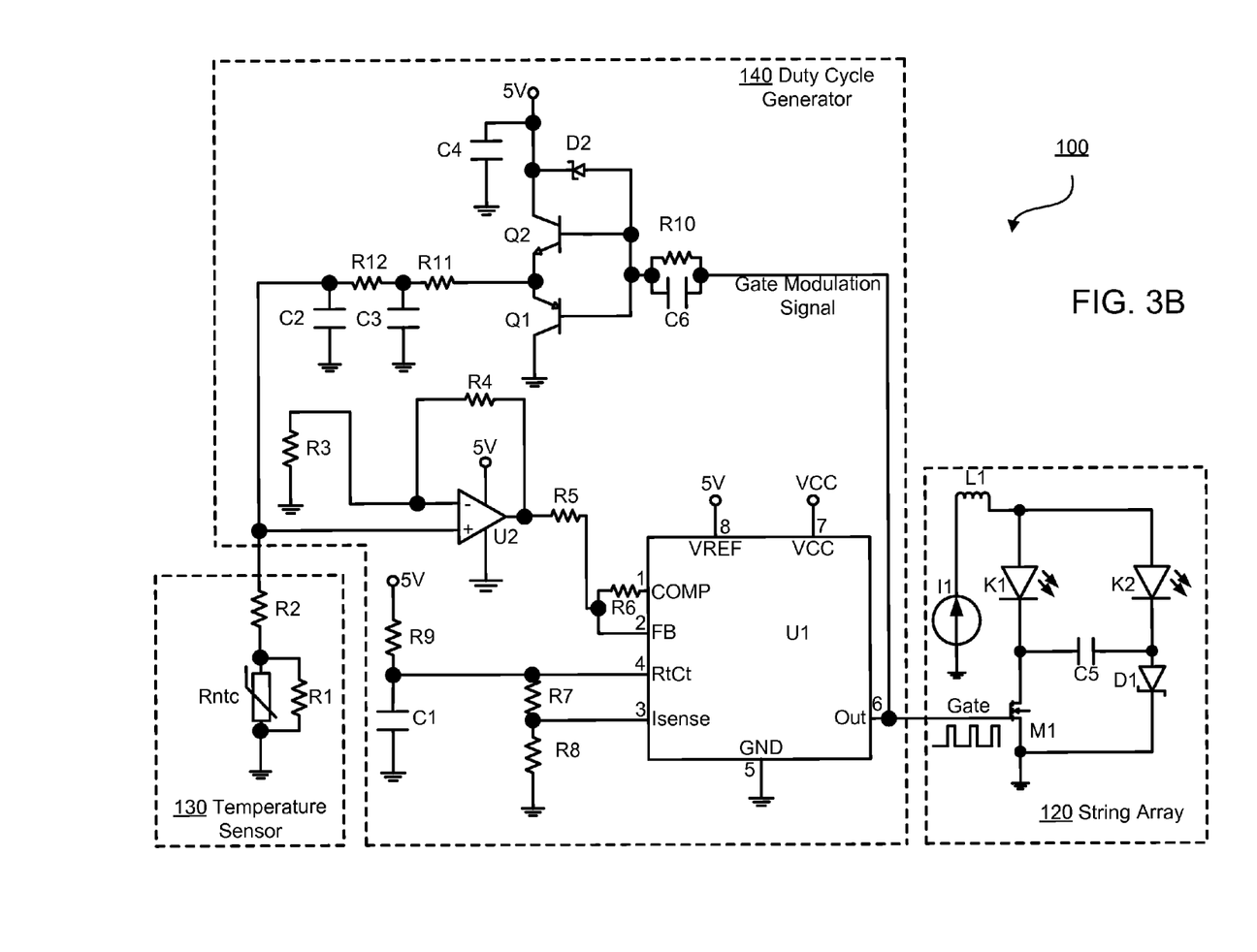
FIG. 3B illustrates a schematic diagram of a lighting system including the controller of FIG. 3A according to embodiments disclosed herein.

FIG. 3B illustrates a partial schematic diagram of the lighting system 100 including the controller 110 of FIG. 3A. The string array 120 of FIG. 3B is implemented as previously discussed herein with regards to FIG. 2B. The temperature sensor 130 of the FIG. 3B is implemented with a resistor R1, a resistor R2, and an NTC thermistor Rntc, similarly to the temperature sensor 130 of FIG. 2B. However, in contrast the temperature sensor 130 of FIG. 2B, the temperature sensor 130 of FIG. 3B has the resistor R1 connected in parallel across the NTC thermistor Rntc, which is connected to ground and to the resistor R2. The resistor R2 is also connected to the duty cycle generator 140, as described below.

As previously explained with reference to FIG. 3A, the duty cycle generator 140 of FIG. 3B is configured with negative feedback and employs a current mode controller U1 operating as a pulse width modulated signal generator. The current mode controller U1 is implemented, for example, with a UC2843 that includes the on-chip oscillator 300, the on-chip error amplifier 310, the on-chip current sensing comparator 320, and the on-chip totem pole driver 330 of the duty cycle generator 140 shown in FIG. 3A, as previously explained. Resistors R5 and R6 provide a feedback network of the on-chip error amplifier 310, and resistors R7 and R8 operate to feed a sawtooth waveform to the on-chip current sensing comparator 320, and the resistor R9 and the capacitor C1 set the frequency of the on-chip oscillator 300. Other embodiments may use any other IC (custom or commercially available) having similar functional blocks. More particularly, the resistor R8 is connected to pin 3 Isense of the current mode controller U1 and to ground. The resistor R7 is connected to the resistor R8 and to pin 4 RtCt of the current mode controller U1. The resistor R9 is connected between a 5V input (which is provided from pin 8 VREF of the current mode controller U1) and pin 4 RtCt of the current mode controller U1. The capacitor C1 is connected between pin 4 RtCt of the current mode controller U1 and ground. The resistor R6 is connected between pin 1 COMP and pin 2 FB of the current mode controller U1. The resistor R5 is connected between pin 2 FB of the current mode controller U1 and an output of an op-amp U2.

Further, note that the current mode controller U1 provides a temperature-compensated on-chip voltage reference 340 of 5V, which is at pin 8 VREF of the current mode controller U1 in FIG. 3B. The amplifier/buffer 350 is implemented with the op-amp U2, which includes an inverting input, a non-inverting input, a positive power supply, and a negative power supply, along with the output mentioned above, and resistors R3 and R4. The resistor R4 is connected between the output of the op-amp U2 and the inverting input of the op-amp U2. The resistor R3 is connected between the inverting input of the op-amp U2 and ground. The positive power supply is connected to the 5V input from pin 8 VREF of the current mode controller U1, and the negative power supply is connected to ground. The resistor R2 of the temperature sensor 130 is connected to the non-inverting input of the op-amp U2. Note that the amplifier/buffer 350 may be, and in some embodiments is, configured to provide additional gain, separate from the on-chip error amplifier 310. Such a distributed gain configuration may provide certain benefits. For instance, the pin 4 RtCt ramp extremes associated with a UC2843 as the current mode controller IC U1 are not clearly specified. Small DC offsets in the sawtooth/ramp signal may be corrected for by the gain of the system, since what is being regulated is an average duty cycle voltage, derived from the relatively stiff 5V reference (VREF).

The RC low pass filter 380 of the duty-cycle-to-voltage conversion stage 360 is implemented with a passive two-pole low pass filter configuration including resistors R11 and R12 along with capacitors C2 and C3. More particularly, the resistor R12 is connected between the non-inverting input of the op-amp U2 and the resistor R11. The capacitor C2 is connected between the non-inverting input of the op-amp U2 and ground. The capacitor C3 is connected between the resistor R12 and the resistor R11, and ground. The resistor R11 is also connected to the totem pole driver 390 as described below. The totem pole driver 390 of the duty-cycle-to-voltage conversion stage 360 is implemented with a PNP transistor Q1 and an NPN transistor Q2, each having a base, an emitter, and a collector, and arranged in a typical gate driver fashion, along with capacitors C4 and C6, a resistor R10, and a Schottky diode D2. More specifically, the base of the PNP transistor Q1 and the base of the NPN transistor Q2 are both connected to an anode of the Schottky diode D2. The collector of the PNP transistor Q1 is connected to ground. The emitter of the PNP transistor Q1 is connected to the emitter of the NPN transistor Q2, both of which are connected to the resistor R11. The collector of the NPN transistor Q2 is connected to a cathode of the Schottky diode D2, and to the 5V input from pin 8 VREF of the current mode controller U1. The capacitor C4 is connected between the collector of the NPN transistor Q2 and ground. The capacitor C6 and the resistor R10 are connected in parallel between the bases of the PNP transistor Q1 and the NPN transistor Q2, and pin 6 Out of the current mode controller U1. In some embodiments, the following components are provided: R1=42 kΩ; R2=6.81 kΩ; and Rntc~100 kΩ (at 20° C.); U1=a UC2843; U2=an LM2904; R3=10 kΩ; R4=16.9 kΩ; R5=3 kΩ; R6=15 kΩ; R7=27 kΩ; R8=13 kΩ; R9=6.8 kΩ; C1=1 nF; C2=C3=2.2 nF; R11=R12=19.1 kΩ; Q2=a BC847C NPN BJT; Q1=a BC857C PNP BJT; C4=100 nF; D2=a BAT54 diode; R10=10 kΩ; and C6=220 pF. Pin 6 out of the current mode controller U1 is connected to the gate of the FET switch M1 of the string array 120. The current mode controller U1 receives power via VCC at pin 7 VCC.

Numerous variations will be apparent in light of this disclosure. For instance, the example solid state light source array topologies may be modified as variously described in the previously incorporated PCT Application No. PCT/IB2012/052731. The controller architecture may also vary from one embodiment to the next, and may include any number of configurations such as alternate ramp generation components, thermal sensors, and/or PWM circuitry. For instance, in some embodiments, the duty cycle is modulated via a microcontroller that senses the thermistor variations at an analog input and adjusts a duty cycle output in proportion to the monitored temperature variations. In some embodiments, the duty cycle is modulated in response to feedback from multiple sources. For example, multiple temperature sensors may be used to detect temperature changes, for example per array of solid state light sources, or a combination of temperature sensors and optical sensors may be used to detect temperature fluctuations and/or optical solid state light source output fluctuations. As will be further appreciated in light of this disclosure, functionally comparable circuits may be used as well, whether custom made or commercially available. For instance, while a 555 timer chip is used in some embodiments, any suitable timer circuit may be used. The same applies to any specific functional ICs or blocks referred to herein—any comparable or otherwise suitable technology may be substituted (e.g., the totem pole driver may be replaced with other driver technology, the UC2843 may be replaced with one or more discrete functional ICs, etc).

Figure 4:
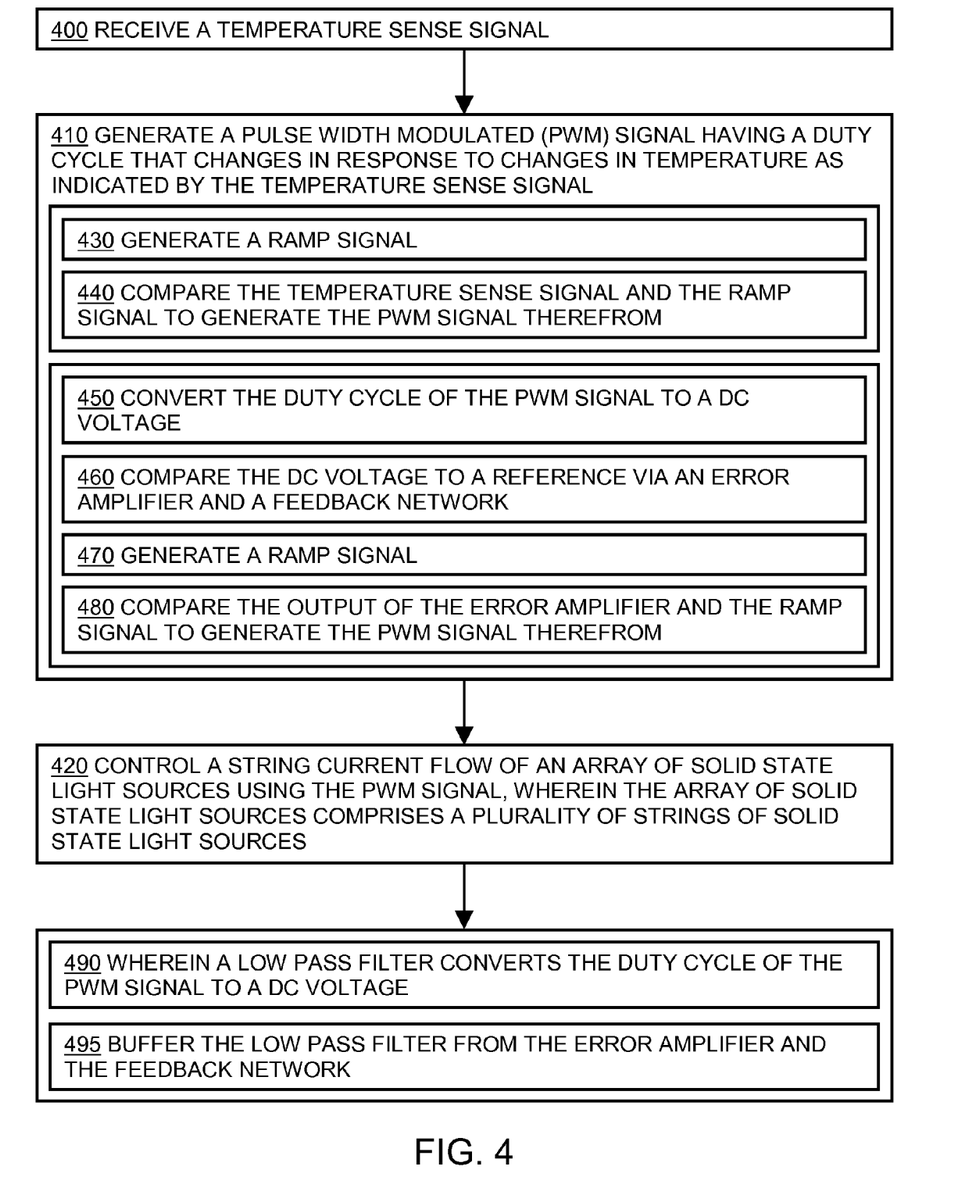
FIG. 4 illustrates a method of controlling a lighting system according to embodiments disclosed herein.

FIG. 4 shows a flowchart of a method of controlling a lighting system/device according to embodiments disclosed herein. In embodiments including software and/or firmware, rectangular elements are herein denoted "processing blocks" and represent software instructions or groups of instructions. Alternatively, the processing blocks represent steps performed by functionally equivalent circuits such as a digital signal processor circuit or an application specific integrated circuit (ASIC). The flowchart does not depict the syntax of any particular programming language. Rather, the flowchart illustrates the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

In FIG. 4, a temperature sense signal is received, step 400. A pulse width modulated (PWM) signal having a duty cycle that changes in response to changes in temperature as indicated by the temperature sense signal is generated, step 410. A string current flow of an array of solid state light sources is controlled using the PWM signal, step 420, wherein the array of solid state light sources comprises a plurality of strings of solid state light sources. In some embodiments, the PWM signal is generated by generating a ramp signal, step 430, and comparing the temperature sense signal and the ramp signal to generate the PWM signal therefrom, step 440. In some embodiments, the PWM signal is generated by converting the duty cycle of the PWM signal to a DC voltage, step 450, comparing the DC voltage to a reference via an error amplifier and a feedback network, step 460, generating a ramp signal, step 470, and comparing the output of the error amplifier and the ramp signal to generate the PWM signal therefrom, step 480. In some embodiments, converting the duty cycle of the PWM signal to a DC voltage is carried out with a low pass filter, step 490, and the method further includes buffering the low pass filter from the error amplifier and the feedback network, step 495.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A lighting system, comprising:
    a temperature sensor circuit configured to generate a temperature sense signal;
    a duty cycle generator circuit configured to receive the temperature sense signal and generate a pulse width modulated (PWM) signal having a duty cycle that changes in response to changes in temperature as indicated by the temperature sense signal; and
    an array of solid state light sources comprising a plurality of strings of solid state light sources, wherein at least one string of solid state light sources in the plurality of strings of solid state light sources is operatively coupled to a switch controlled by the PWM signal, wherein the switch controls current flow through the plurality of strings of solid state light sources;
    wherein the duty cycle generator comprises:
    a duty-cycle-to-voltage conversion stage to convert the PWM signal to a DC voltage;
    an error amp configured to provide negative feedback to regulate the DC voltage;
    a ramp generator configured to generate a periodic ramp signal; and
    a comparator configured to receive both the output of the error amp and the ramp signal as inputs and to generate the PWM signal therefrom.

2. The lighting system of claim 1, wherein the duty cycle of the PWM signal is increased or decreased in response to a corresponding increase or decrease in temperature detected by the temperature sensor circuit.

3. The lighting system of claim 1, wherein the duty cycle generator comprises:
a ramp generator configured to generate a periodic ramp signal; and
a comparator configured to receive the temperature sense signal and the ramp signal as input and to generate the PWM signal therefrom.

4. The lighting system of claim 3, wherein the ramp generator comprises a current source connected to a capacitor and timer circuitry configured to generate an oscillating ramp signal.

5. The lighting system of claim 3, wherein the duty cycle generator comprises a driver circuit configured to receive the PWM signal from the comparator and to drive the PWM signal to the switch.

6. The lighting system of claim 1, wherein the duty-cycle-to-voltage conversion stage comprises:
a low pass filter to convert the PWM signal to the DC voltage; and
a driver circuit configured to receive the PWM signal and to provide it to the low pass filter.

7. The lighting system of claim 6, wherein the duty cycle generator further comprises a buffer to isolate the error amp from the low pass filter.

8. The lighting system of claim 7, wherein the buffer is configured to provide gain to the DC voltage that is output by the low pass filter.

9. The lighting system of claim 7, wherein at least one of the buffer and the driver circuit are powered by a temperature-compensated voltage supply.

10. The system of claim 9, wherein the ramp generator, the error amp, the comparator, and the temperature-compensated voltage supply are on-chip functional blocs of an integrated circuit.

11. The lighting system of claim 1, wherein the temperature sensor circuit comprises a thermistor-based resistive divider.

12. A method of controlling a lighting system, comprising:
receiving a temperature sense signal;
generating a pulse width modulated (PWM) signal having a duty cycle that changes in response to changes in temperature as indicated by the temperature sense signal, wherein generating the PWM signal comprises:
converting the duty cycle of the PWM signal to a DC voltage;
comparing the DC voltage to a reference via an error amplifier and a feedback network;
generating a ramp signal; and
comparing the output of the error amplifier and the ramp signal to generate the PWM signal therefrom; and
controlling a string current flow of an array of solid state light sources using the PWM signal, wherein the array of solid state light sources comprises a plurality of strings of solid state light sources.

13. The method of claim 12, wherein generating the PWM signal comprises:
generating a ramp signal; and
comparing the temperature sense signal and the ramp signal to generate the PWM signal therefrom.

14. The method of claim 12, wherein converting the duty cycle of the PWM signal to a DC voltage is carried out with a low pass filter, the method further comprising buffering the low pass filter from the error amplifier and the feedback network.

15. A lighting system, comprising:
a temperature sensor circuit configured to generate a temperature sense signal;
a duty cycle generator circuit configured to receive the temperature sense signal and generate a pulse width modulated (PWM) signal having a duty cycle that changes in response to changes in temperature as indicated by the temperature sense signal; and
an array of solid state light sources comprising a plurality of strings of solid state light sources, wherein at least one string of solid state light sources in the plurality of strings of solid state light sources is operatively coupled to a switch controlled by the PWM signal, wherein the switch controls current flow through the plurality of strings of solid state light sources;
wherein the system is further configured to increase total input current provided to the array of solid state light sources to compensate for a decrease in lumens output by the array of solid state light sources resulting from string-current rebalancing.

* * * * *